US012620909B2

(12) United States Patent
Rosado et al.

(10) Patent No.: US 12,620,909 B2
(45) Date of Patent: May 5, 2026

(54) POWER CONVERSION SYSTEM FOR REDUCING DC-LINK CAPACITOR STRESS

(71) Applicant: Huawei Technologies Co., Ltd., Shenzhen (CN)

(72) Inventors: Sebastian Rosado, Nuremberg (DE); Zhaohui Wang, Shenzhen (CN); Miroljub Bakic, Nuremberg (DE); Piniwan Thiwanka Bandara Wijekoon, Nuremberg (DE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 216 days.

(21) Appl. No.: 18/640,731

(22) Filed: Apr. 19, 2024

(65) Prior Publication Data

US 2024/0266972 A1    Aug. 8, 2024

Related U.S. Application Data

(63) Continuation of application No. PCT/EP2021/079157, filed on Oct. 21, 2021.

(51) Int. Cl.
*H02M 7/483*    (2007.01)
*H02M 1/00*    (2006.01)
(Continued)

(52) U.S. Cl.
CPC ....... *H02M 7/4833* (2021.05); *H02M 1/0043* (2021.05); *H02M 7/483* (2013.01);
(Continued)

(58) Field of Classification Search
CPC .. H02M 7/4833; H02M 1/0043; H02M 7/493; H02M 3/33584; H02M 1/0064;
(Continued)

(56) References Cited

U.S. PATENT DOCUMENTS 8,730,691 B2    5/2014 Paatero
2014/0340948 A1*  11/2014 Suzuki .................. H02M 7/537
363/40
(Continued)

FOREIGN PATENT DOCUMENTS

CN    109103870 A    12/2018
CN    112737383 A    4/2021
(Continued)

OTHER PUBLICATIONS

Di Zhang et al:"DC-Link Ripple Current Reduction for Paralleled Three-Phase Voltage-Source Converters With Interleaving", IEEE Transactions on Power Electronics, vol. 26, No. 6, Jun. 2011, total 13 pages.

*Primary Examiner* — Thienvu V Tran
*Assistant Examiner* — Jonathan Walter Soileau
(74) *Attorney, Agent, or Firm* — Conley Rose, P.C.

(57)    ABSTRACT

A power conversion system includes a first direct current to alternating current (DC-AC) inverter, a second DC-AC inverter, an inverter controller, a direct current (DC)-link circuit connecting the first DC-AC inverter and the second DC-AC inverter, a neutral-point balancer (NPB), an NPB circuit, and an NPB controller. The inverter controller is configured to provide a pulse-width modulation (PWM), signal to the first DC-AC inverter and the second DC-AC inverter. The NPB circuit is configured to reduce low frequency current oscillations in the DC-link circuit by switching between a first state for transferring charge from a positive voltage line to a neutral voltage line, and a second state for transferring charge from the neutral voltage line to a negative voltage line. The NPB controller is configured to control the switching of the NPB circuit and is synchronized with the PWM signal from the inverter controller.

20 Claims, 7 Drawing Sheets

(51) Int. Cl.
    *H02M 7/487*     (2007.01)
    *H02M 7/493*     (2007.01)
    *H02M 3/335*     (2006.01)

(52) U.S. Cl.
    CPC ........... *H02M 7/487* (2013.01); *H02M 7/493*
               (2013.01); *H02M 3/33584* (2013.01)

(58) Field of Classification Search
    CPC ...... H02M 3/158; H02M 7/487; H02M 7/483;
             H02J 2300/24; H02J 3/381; H02J 1/08;
                      H02J 3/38; Y02E 10/56
    See application file for complete search history.

(56) References Cited

U.S. PATENT DOCUMENTS

| | | | |
|---|---|---|---|
| 2021/0288506 A1 * | 9/2021 | Tanaka .................... | B60L 58/19 |
| 2024/0097550 A1 * | 3/2024 | Rosado ................. | H02M 7/487 |

FOREIGN PATENT DOCUMENTS

| | | | | |
|---|---|---|---|---|
| EP | 4080748 A1 * | 10/2022 | .............. | H02M 5/12 |
| JP | 2010519890 A | 6/2010 | | |
| JP | 2013176296 A | 9/2013 | | |
| WO | 0147094 A2 | 6/2001 | | |

* cited by examiner

200 ⟶

302

300

DC-Capacitor currents vs. injection angle

702 —⟩

704 —⟩

706 —⟩

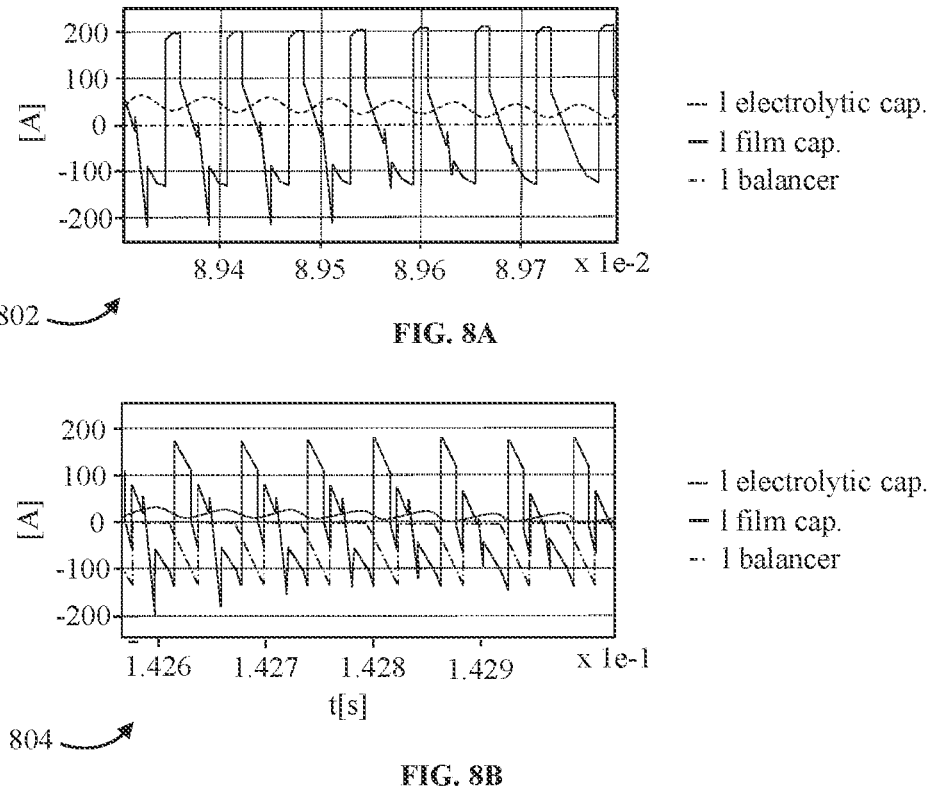
802
FIG. 8A
— l electrolytic cap.
— l film cap.
-- l balancer
— l electrolytic cap.
— l film cap.
-- l balancer
804
FIG. 8B
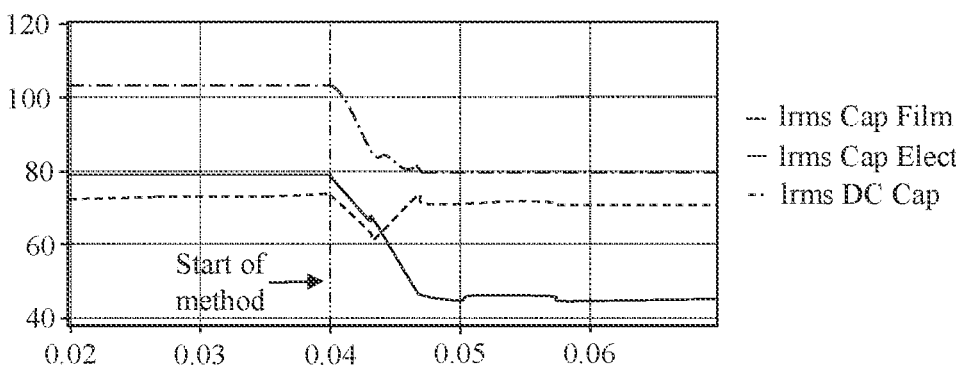
— Irms Cap Film
— Irms Cap Elect
-- Irms DC Cap
FIG. 9

POWER CONVERSION SYSTEM FOR REDUCING DC-LINK CAPACITOR STRESS

CROSS-REFERENCE TO RELATED APPLICATIONS

This is a continuation of International Patent Application No. PCT/EP2021/079157, filed on Oct. 21, 2021, the disclosure of which is hereby incorporated by reference in its entirety.

TECHNICAL FIELD

The disclosure relates generally to a power conversion system, and more particularly, the disclosure relates to the power conversion system for reducing DC-link capacitor stress in parallel connected multilevel power converters with higher operation efficiency and increased power density.

BACKGROUND

An inverter is an electronic device that turns direct current (DC) to alternating current (AC). The inverter is also configured to control speed and torque for electric motors, and also can be used for other DC/AC converter applications like photovoltaics power converters for solar inverters.

Normally, the photovoltaic power converter includes three-phase DC/AC inverters based on two and multi-level circuit topologies with DC-link capacitors arranged in a split DC-bus. The DC-link capacitors optimize the capacitor usage with a voltage source and energy source by providing a low impedance path for circulation of high-frequency current components, thereby providing stability and grid code compliance in the power conversion system. The capacitors with low internal impedance and large root mean square (RMS) current capability, like film-type capacitors, on a DC/AC power converter 104A for a photovoltaic application 102, are shown in FIG. 1A. When it is necessary to reach higher power levels, it is necessary to connect two or more inverters in parallel with just hard paralleling or in interleaved mode. The capacitors providing a large capacitance in a small volume, like electrolytic-type capacitors, on two or more DC/AC power converters 104B-C for the photovoltaic application 102, is shown in FIG. 1B. In the AC side, the two or more DC/AC power converters 104B-C are connected to three-phase systems through AC inductors. One or more interleaving inductors are shown in FIG. 1C. The combination of capacitors with low internal impedance is shown in FIG. 1A and the capacitors providing the large capacitance as shown in FIG. 1B, allows an overall compact DC-link capacitor bank, that enables the solar inverter for high power density.

The combination may be a circuit or connection of the parallel inverters, that relates to a shift between pulse width modulation (PWM) signals to trigger semiconductors in the circuit. The shift in the PWM is an angle shift in carrier waveforms that produce the PWM signals. An interleaving angle may be adjustable and an optimal value is related to an operation scheme of the interleaved inverters, thereby including a major effect in the optimal interleaving angle in the type of modulation.

The use of interleaving in parallel converters has a significant impact on an RMS current circulating through the capacitors in the DC-link of the DC/AC inverters (i.e. the one or more DC/AC power converters 104B-C). The current value dependence is due to current cancellation effects at certain values of the interleaving angle. The value of the RMS current in the interleaving case is smaller than the algebraic sum of the RMS currents in the DC/AC inverters, with separate DC links. The interleaving may reduce the current stress on the DC link. But the current reduction affects the high-frequency components circulating through the capacitors. Also, the split DC link with two different capacitors with a predominantly different current component spectrum, as shown in FIG. 1A, the current reduction that interleaving can provide only impacts the high-frequency section. The low-frequency current components do not experience any benefit from the interleaving and are not be affected by the interleaving angle.

The type of modulation used by the interleaved inverters has a major impact on the DC-link capacitor currents, as there are many types and variants of modulation schemes in use, each has its own characteristics in terms of operation performance, like power loss, current distortion, and stress on active circuit components as well as passive circuit components. Discontinuous PWM (DPWM) is widely used for the reduction of the power semiconductor switching losses. But in the multi-level inverters, DPWM produces an oscillation of the partial DC-link voltages. The oscillation is a characteristic of the modulation type employed on the multi-level inverters. Modulation waveforms may be in a modulation pattern that is based on the selection of the characteristics. For example, DPWM3 produces a smaller neutral voltage oscillation than DPWM1, but in terms of semiconductor power loss or AC line current distortion, the DPWM3 performance is lower than the DPWM1.

The partial DC-link voltage oscillations are related to larger current stress on the capacitors, especially in the split DC-link, the voltage oscillations relate to low-frequency current stresses. A software-based approach and a hardware-based approach are used to reduce the partial DC-link voltage oscillations and related current stress on the capacitors.

The software-based approach includes modulation schemes that have inherently low DC-link voltage oscillation present usually a trade-off among the modulation performance parameters. The low DC-link oscillations will be counter-parted with larger semiconductor power loss dissipation, negatively impacting the power converter efficiency. Another performance parameter that could suffer is the distortion in the output current requiring a larger harmonic filtering effort. In solar photovoltaic power conversion, efficiency and low harmonic distortion are of major importance and therefore the software-based solutions become less attractive. The hardware-based approach is like a power converter transferring energy among the DC-links, which can be deployed with minimum impact on the DC/AC power inverter with optimized operation. Also, they introduce additional currents on the DC-link, which may mitigate/reduce the low-frequency oscillations and the low-frequency current on the capacitors at the expense of increasing the high-frequency current stress. In case of the split DC-link, the capacitors being circulated by the high-frequency current components withstand the higher current stress, and also imply the amount of capacitor units for the increased high-frequency section of the busbar, negatively impacting the power density.

Therefore, there arises a need to address the aforementioned technical problem/drawbacks in developing a solution that allows both the low-frequency current components and the high frequency current components on the DC-link at low values.

SUMMARY

It is an object of the disclosure to provide a power conversion system for reducing DC-link capacitor stress with higher operation efficiency and increased power density while avoiding one or more disadvantages of other approaches.

This object is achieved by the features of the independent claims. Further, implementation forms are apparent from the dependent claims, the description, and the figures.

The disclosure provides a power conversion system for reducing DC-link capacitor stress in parallel connected multilevel power converters with higher operation efficiency and increased power density.

According to a first aspect, there is provided a power conversion system. The power conversion system includes a first DC-AC inverter and a second DC-AC inverter. The power conversion system includes an inverter controller that is configured to provide a pulse-width modulation, PWM, signal to the first DC-AC inverter and the second DC-AC inverter. The power conversion system includes a DC-link circuit connecting the first DC-AC inverter and the second DC-AC inverter in parallel. The DC-link circuit includes a high-frequency and a low-frequency positive-line capacitor, each connecting a neutral voltage line with a positive voltage line, and a high-frequency and a low-frequency negative-line capacitor, each connecting the neutral voltage line with a negative voltage line. The power conversion system includes a neutral-point balancer (NPB) circuit that is configured to reduce low-frequency current oscillations in the DC-link circuit by switching between a first state, for transferring charge from the positive voltage line to the neutral voltage line, and a second state, for transferring charger from the neutral voltage line to the negative voltage line. The power conversion system includes a NPB controller that is configured to control the switching of the NPB circuit, and the NPB controller is synchronized with the PWM signal from the inverter controller.

The power conversion system achieves reduced current stresses on the DC-link capacitors for low-frequency components and high-frequency components. This reduction of the current stresses enables the DC-link with smaller capacitance and smaller size, and increasing power density of the first DC-AC inverter and the second DC-AC inverter. The power conversion system achieves the reduced current stresses by proper synchronization of carriers of the first DC-AC inverter and the second DC-AC inverter and the NPB circuit. The power density benefits are significant as the DC-link capacitance is a larger contributor to inverter volume. The power conversion system reduces the cost consumption due to the use of less and smaller components. The power conversion system minimizes an impact of the NPB operation on the DC-link by reducing values of circulating currents. The power conversion system achieves a higher operation efficiency as it minimizes the impact on partial DC-link voltage oscillations. The power conversion system provides an adjustable control over the DC-link capacitor's low-frequency current stress. A degree of freedom is obtained and allows for an enhanced system optimization. The power conversion system may be applied to multilevel DC-AC converters or single-stage DC-AC converters.

Optionally, the NPB circuit is a bidirectional DC-DC converter.

Optionally, the NPB circuit includes a positive line switch connecting the neutral voltage line with the positive voltage line, with an antiparallel diode, a negative line switch connecting the neutral voltage line with the negative voltage line, with an antiparallel diode, and one or more inductors.

Optionally, each of the DC-AC inverters is at least a three-level inverter. The DC-AC inverters may be a multilevel converter in a three-phase interleaved configuration, i.e. two or more three-phase inverters may be connected to the same three-phase interleaved configuration through one or more line inductors.

Optionally, the NPB controller is configured to set a switching frequency of the NPB circuit to be an integer multiple of an inverter switching frequency set by the inverter controller.

Optionally, the NPB controller is configured to determine an optimal value for a phase angle between a carrier signal of the NPB circuit and the PWM signal at which high-frequency current oscillations in the DC-link circuit are below a threshold amplitude, and adjust a phase of the carrier signal of the NPB circuit such that the phase angle approaches the optimal value.

Optionally, the optimal value of the phase angle is determined by a look-up table based on a ratio between a switching frequency of the NPB and an inverter switching frequency set by the inverter controller, and the type of modulation used by the inverter controller.

Optionally, the optimal value of the phase angle is determined by monitoring an RMS value of a high-frequency current through the high-frequency capacitors, and adjusting the phase angle of the carrier signal of the NPB circuit to determine a value of the phase angle at which the monitored RMS value is below the threshold amplitude.

Optionally, the high-frequency capacitors are tuned to have a resonant frequency at a high-frequency that is at least a predefined frequency distance away from an inverter switching frequency set by the inverter controller.

Optionally, the high-frequency capacitors are film type capacitors.

Optionally, the low-frequency capacitors are configured to be tuned such that a branch connecting the low-frequency capacitors has a resonant frequency at a frequency in a frequency range between three times the output line frequency of the DC-AC inverters and the switching frequency of the DC-AC inverters.

Optionally, the resonant frequency is at least the pre-defined frequency distance away from the boundaries of the frequency range.

Optionally, the low frequency capacitors are electrolytic type capacitors.

Therefore, in contradistinction to the existing solutions, the power conversion system achieves reduced current stresses on the DC-link capacitors for low-frequency components and high-frequency components. The power conversion system achieves the reduced current stresses by proper synchronization of carriers of the first DC-AC inverter and the second DC-AC inverter and the NPB circuit. The power conversion system reduces the cost consumption due to the use of less and smaller components. The power conversion system achieves a higher operation efficiency as it minimizes the impact on partial DC-link voltage oscillations. A degree of freedom is obtained and allows for enhanced system optimization. These and other aspects of the disclosure will be apparent from and the implementation (s) described below.

BRIEF DESCRIPTION OF DRAWINGS

Implementations of the disclosure will now be described, by way of example only, with reference to the accompanying drawings.

FIGS. 8A-8B are graphical representations of simulation results for DC-link capacitor currents in accordance with an implementation of the disclosure; and FIG. 9 is a graphical representation of simulation results for a root mean square, RMS value of current in DC-link capacitors in accordance with an implementation of the disclosure.

DETAILED DESCRIPTION

Implementations of the disclosure provide a power conversion system for reducing DC-link capacitor stress in parallel connected multilevel power converters with higher operation efficiency and increased power density.

To make solutions of the disclosure more comprehensible for a person skilled in the art, the following implementations of the disclosure are described with reference to the accompanying drawings.

Terms such as "a first", "a second", "a third", and "a fourth" (if any) in the summary, claims, and foregoing accompanying drawings of the disclosure are used to distinguish between similar objects and are not necessarily used to describe a specific sequence or order. It should be understood that the terms so used are interchangeable under appropriate circumstances, so that the implementations of the disclosure described herein are, for example, capable of being implemented in sequences other than the sequences illustrated or described herein. Furthermore, the terms "include" and "have" and any variations thereof, are intended to cover a non-exclusive inclusion. For example, a process, a method, a system, a product, or a device that includes a series of steps or units, is not necessarily limited to expressly listed steps or units but may include other steps or units that are not expressly listed or that are inherent to such process, method, product, or device.

Figure 1A:
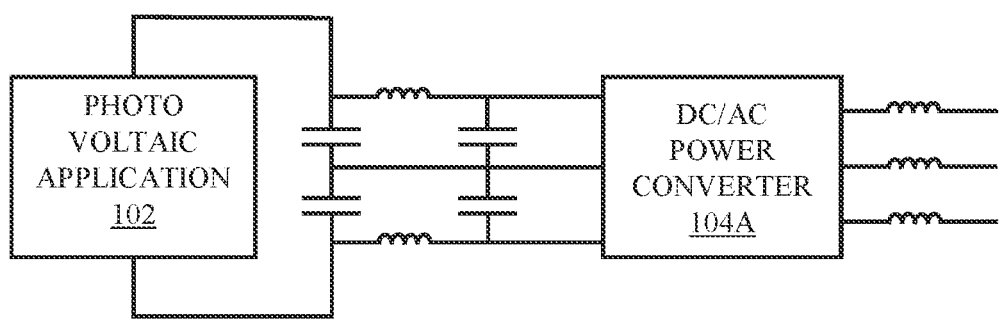
FIG. 1A is a schematic diagram of a DC/AC power converter for a photo voltaic application.
Figure 1B:
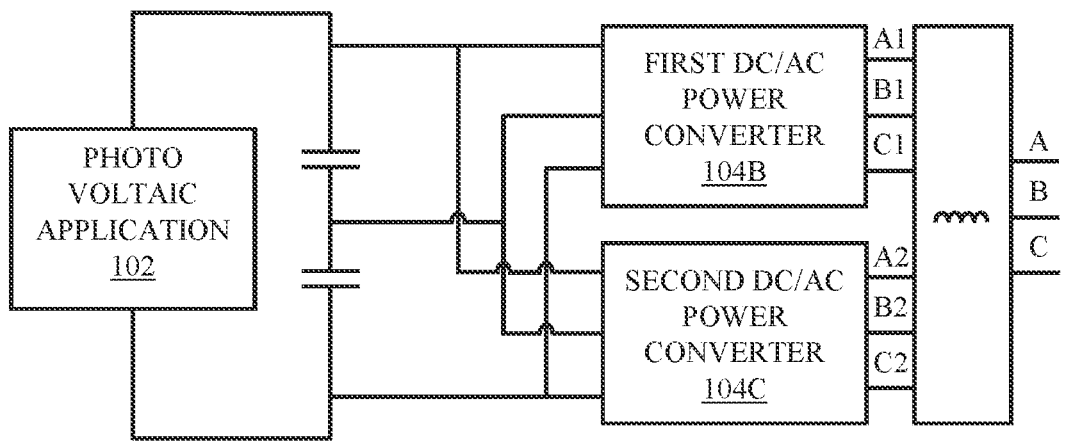
FIG. 1B is a schematic diagram of two or more DC/AC power converters for a photo voltaic application.
Figure 1C:
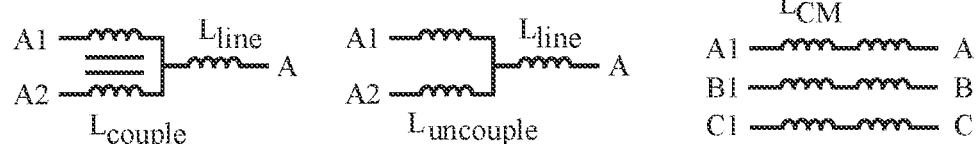
FIG. 1C is a schematic diagram of one or more interleaving inductors used in FIG. 1B.
Figure 2:
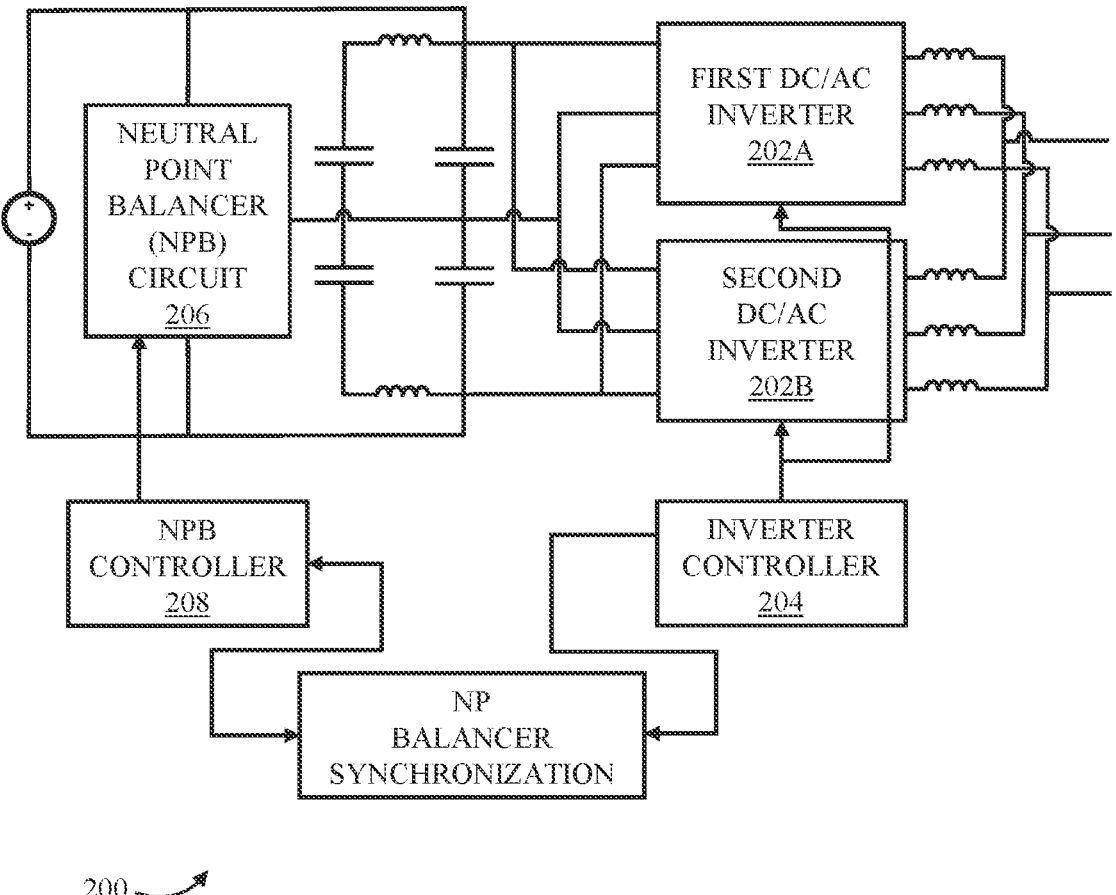
FIG. 2 is a schematic diagram of a power conversion system in accordance with an implementation of the disclosure.

FIG. 2 is a schematic diagram of a power conversion system 200 in accordance with an implementation of the disclosure. The power conversion system 200 includes a first DC-AC inverter 202A and a second DC-AC inverter 202B, an inverter controller 204 configured to provide a pulse-width modulation, PWM, signal to the first DC-AC inverter 202A, and the second DC-AC inverter 202B, a DC-link circuit connecting the first DC-AC inverter 202A and the second DC-AC inverter 202B in parallel, an NPB circuit 206 configured to reduce low-frequency current oscillations in the DC-link circuit by switching between a first state, for transferring charge from the positive voltage line to the neutral voltage line, and a second state, for transferring charge from the neutral voltage line to the negative voltage line, and a NPB controller 208 configured to control the switching of the NPB circuit, and the NPB controller is synchronized with the PWM signal from the inverter controller 204. The DC-link circuit includes a high-frequency and a low-frequency positive-line capacitor, each connecting a neutral voltage line with a positive voltage line, and a high-frequency and a low-frequency negative-line capacitor, each connecting the neutral voltage line with a negative voltage line.

The power conversion system 200 achieves reduced current stresses on the DC-link capacitors for low-frequency components and high-frequency components. This reduction of the current stresses enables the DC-link with smaller capacitance and smaller size, and increasing power density of the first DC-AC inverter 202A and the second DC-AC inverter 202B. The power conversion system 200 achieves the reduced current stresses by proper synchronization of carriers of the first DC-AC inverter 202A and the second DC-AC inverter 202B, and the NPB circuit 206. The power density benefits are significant as the DC-link capacitance is a larger contributor to inverter volume. The power conversion system 200 reduces the cost consumption due to the use of less and smaller components. The power conversion system 200 minimizes an impact of the NPB operation on the DC-link by reducing values of circulating currents. The power conversion system 200 achieves a higher operation efficiency as it minimizes the impact on partial DC-link voltage oscillations. The power conversion system 200 provides an adjustable control over the DC-link capacitor's low frequency current stress. A degree of freedom is obtained and allows for an enhanced system optimization. The power conversion system 200 may be applied to multilevel DC-AC converters or single stage DC-AC converters.

The first DC-AC inverter 202A and the second DC-AC inverter 202B are configured to change direct current (DC) to alternating current (AC). The first DC-AC inverter 202A and the second DC-AC inverter 202B include one or more inductors in an AC side and a DC-link configured with split DC-link capacitors with one or more groups of capacitors including a first group of capacitors and a second group of capacitors. The first group of capacitors may be circulated by high frequency current components, and the second group of capacitors may be circulated by low frequency current components. Optionally, the first group of capacitors is high frequency type capacitors and the second group of capacitors is low frequency type capacitors. Optionally, the high frequency current components are components at or near a switching frequency and it multiplies, and the low frequency current components are components at three times a line frequency, for example, at 150 hertz (Hz), and harmonics. The high frequency current components may be high frequency capacitors and the low frequency current components may be low frequency capacitors. The high frequency capacitors may be made of film type capacitors, e.g. polypropylene, and the low frequency capacitors may be made of electrolytic type.

The inverter controller 204 is configured to provide the PWM signal to the first DC-AC inverter 202A and the second DC-AC inverter 202B. The NPB circuit 206 transfers charge from the one or more capacitors in each half of the DC-link, thereby reducing voltage oscillations, i.e. at three times the line frequency, of partial DC-link voltages. Optionally, transferring the charge from the one or more capacitors in each half of the DC-link reduces the low frequency oscillations. The reduction of the voltage oscillations may produce a reduction of the magnitude of the low frequency current components on the one or more groups of capacitors circulated predominantly with the current components.

The NPB controller 208 is configured to regulate operations of the NPB circuit 206, and the first DC-AC inverter 202A and the second DC-AC inverter 202B, and produce one or more gating signals to respective power semiconductors. The NPB controller 208 provides synchronization of the NPB circuit 206 and the PWM signal executed by the inverter controller 204. Optionally, the inverter controller 204 executes one or more carriers to provide the PWM signal.

The NPB controller 208 may synchronize the carriers used for the PWM signal in the first DC-AC inverter 202A and the second DC-AC inverter 202B, and the NPB circuit 206. The NPB controller 208 provides the synchronization of the carrier signals when at least one of (i) the switching frequency (fsw) of the NPB circuit 206 is an integer number, or (ii) an angle between the carriers in the first DC-AC inverter 202A and the second DC-AC inverter 202B, and in the NPB circuit 206 is at a specific value. Optionally, the fsw of the NPB circuit 206 can be 1×, 2×, 3×, and the like, in the first DC-AC inverter 202A and the second DC-AC inverter 202B. Optionally, the angle between the carriers at the specific value minimizes the high-frequency current components on the corresponding DC-link capacitors. The NPB controller 208 synchronizing the PWM signal reduces the DC-link capacitor stress in the first DC-AC inverter 202A and the second DC-AC inverter 202B.

Figure 3:
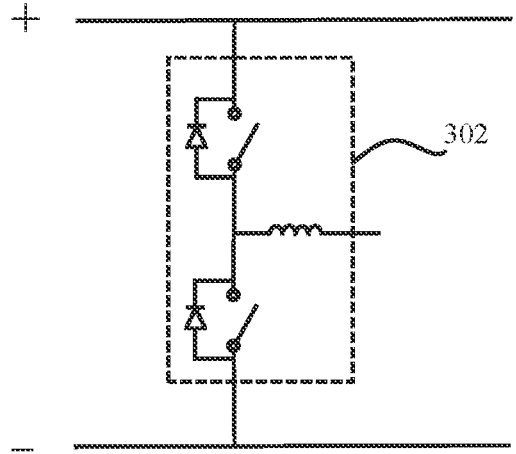
FIG. 3 is a schematic diagram of an NPB circuit in accordance with an implementation of the disclosure.

FIG. 3 is a schematic diagram 300 of an NPB circuit 302 in accordance with an implementation of the disclosure. The NPB circuit 302 is to be synchronized to an inverter modulation in order to reduce DC-link voltage fluctuations. Optionally, the NPB circuit 302 is a bidirectional DC-DC converter. The NPB circuit 302 transfers energy between partial DC-links in one or more inverters. The one or more inverters may be DC-AC inverters.

Optionally, the NPB circuit 302 includes a positive line switch connecting a neutral voltage line with a positive voltage line, with an antiparallel diode, a negative line switch connecting the neutral voltage line with a negative voltage line, with an antiparallel diode, and one or more inductors.

Optionally, each of the DC-AC inverters is at least a three-level inverter.

Figure 4:
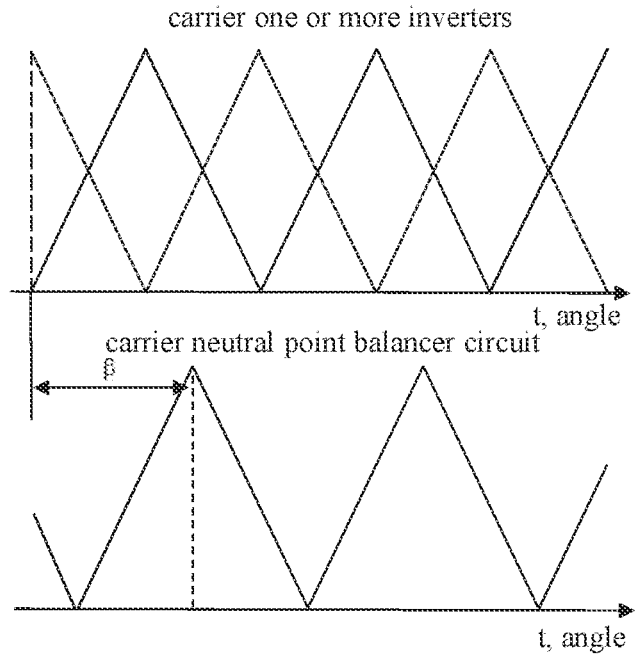
FIG. 4 is a graphical representation of carriers to generate a PWM signal in one or more inverters and an NPB circuit in accordance with an implementation of the disclosure.

FIG. 4 is a graphical representation of carriers to generate a, PWM signal in one or more inverters and an NPB circuit in accordance with an implementation of the disclosure. The one or more inverters may be parallel inverters. The one or more inverters may be interleaved inverters. The graphical representation includes an angle in an X-axis. The carriers for the one or more inverters and the NPB circuit generate the PWM signal with an inverter controller. An angle between the carriers may be a specific value, that minimizes high-frequency current components on corresponding DC-link capacitors. Optionally, an angle of injection shows the angle between the carriers and is marked as p.

Figure 5:
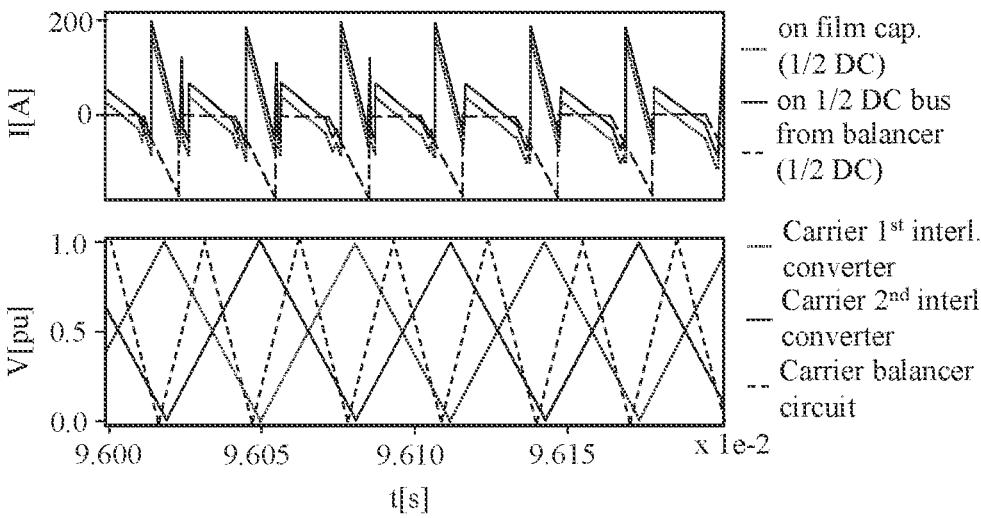
FIG. 5 is a graphical representation of carrier signals of one or more inverters and resulting DC-link currents in accordance with an implementation of the disclosure.

FIG. 5 is a graphical representation of carrier signals of one or more inverters and resulting DC-link currents in accordance with an implementation of the disclosure. The graphical representation depicts the carrier signals when switching frequency (fsw) in an NPB circuit is two times the fsw in the one or more inverters, and capacitor currents. The graphical representation includes a time in seconds in an X-axis, and Voltage in pulse, and Current in ampere in a Y-axis. An angle of injection shows an angle of the carrier signals. The graphical representation depicts resulting current for the angle of injection. Optionally, the resulting current on a film capacitor is smaller due to actions on the NPB circuit.

Optionally, the angle of injection depends on a ratio between switching frequencies, between the NPB circuit and the one or more inverters, and type of modulation used by the one or more inverters. The angle of injection may be relatively uniform among load-changing conditions with fixed characteristics of switching frequencies and types of modulation.

Figures 6A, 6B:
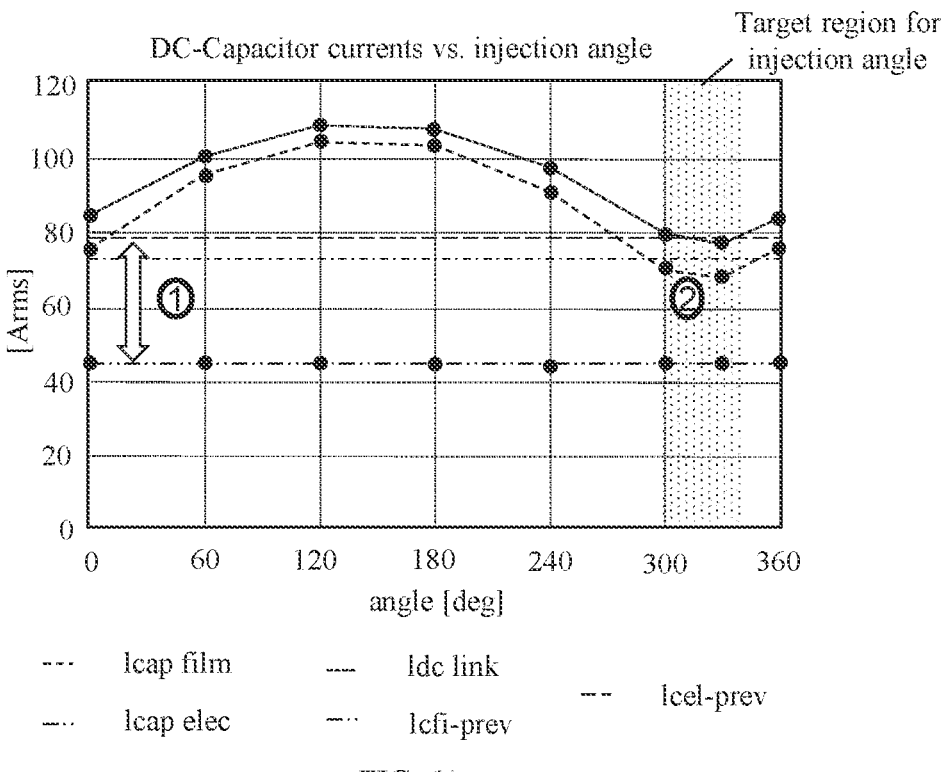
FIG. 6A is a graphical representation of evolution of current on DC-link capacitors when an NPB circuit switching frequency (fsw) doubles one or more inverters fsw in accordance with an implementation of the disclosure.
FIG. 6B is a graphical representation of evolution of current on DC-link capacitors when an NPB circuit switching frequency (fsw) is same as one or more inverters fsw in accordance with an implementation of the disclosure.

FIG. 6A is a graphical representation of evolution of current on DC-link capacitors when an NPB circuit switching frequency (fsw) doubles one or more inverters fsw in accordance with an implementation of the disclosure. The graphical representation depicts the evolution of current on the DC-link capacitors for high frequency type capacitors and low frequency type capacitors. The graphical representation includes an angle in degrees in an X-axis and currents in ampere in a Y-axis. The low frequency type capacitors remain constant regardless of an injection angle, and the high frequency type capacitors are highly dependent on the injection angle. The current components of the high frequency type capacitors are minimized at a target region for the injection angle.

FIG. 6B is a graphical representation of evolution of current on DC-link capacitors when an NPB circuit switching frequency (fsw) is same as one or more inverters fsw in accordance with an implementation of the disclosure. The graphical representation depicts the evolution of current on the DC-link capacitors for high frequency type capacitors and low frequency type capacitors. The graphical representation includes an angle in degrees in an X-axis and currents in ampere in a Y-axis. The low frequency type capacitors remain constant regardless of an injection angle, and the high frequency type capacitors are highly dependent on the injection angle. The current components of the high frequency type capacitors are minimized at a target region for the injection angle. Optionally, the NPB circuit is synchronized by an NPB controller.

Optionally, the NPB controller includes one or more approaches including a first approach and a second approach, to reach an optimal synchronization between carriers and reduce the high-frequency type capacitors. The first approach may be in an open loop by using pre-calculated values, i.e. look-up table. Optionally, optimal values are pre-programmed based on previous analysis in the first approach. Optionally, the angle of injections is pre-programmed. The second approach may be in a close loop where the RMS value of the current is monitored using appropriate filters for a range of interest. Optionally, current components are minimized by a feedback control loop based on the RMS values during a power converter operation.

Optionally, the NPB controller is configured to set a switching frequency of the NPB circuit to be an integer multiple of an inverter switching frequency set by the inverter controller.

Optionally, the NPB controller is configured to determine an optimal value for a phase angle between a carrier signal of the NPB circuit and the PWM signal at which high frequency current oscillations in the DC-link circuit are below a threshold amplitude, and adjust a phase of the carrier signal of the NPB circuit such that the phase angle approaches the optimal value. The optimal value may be in a range of 60 degrees to 180 degrees. The optimal value may be in a range of 240 degrees to 360 degrees.

Optionally, the optimal value of the phase angle is determined by a look-up table based on a ratio between a switching frequency of the NPB and an inverter switching frequency set by the inverter controller, and the type of modulation used by the inverter controller. Optionally, the optimal value of the phase angle is determined by monitoring the RMS value of a high frequency current through the high frequency capacitors, and adjusting the phase angle of the carrier signal of the NPB circuit to determine a value of the phase angle at which the monitored RMS value is below the threshold amplitude.

Optionally, the high frequency capacitors are tuned to have a resonant frequency at a high frequency that is at least a predefined frequency distance away from an inverter switching frequency set by the inverter controller.

Optionally, the high frequency capacitors are film type capacitors.

Optionally, the low frequency capacitors are configured to be tuned such that a brand connecting the low frequency capacitors has a resonant frequency at a frequency in a frequency range between three times an output line frequency of DC-AC inverters and the switching frequency of the DC-AC inverters.

Optionally, the resonant frequency is at least the predefined frequency distance away from boundaries of the frequency range.

Optionally, the low frequency capacitors are electrolytic type capacitors.

Figures 7A, 7B, 7C:
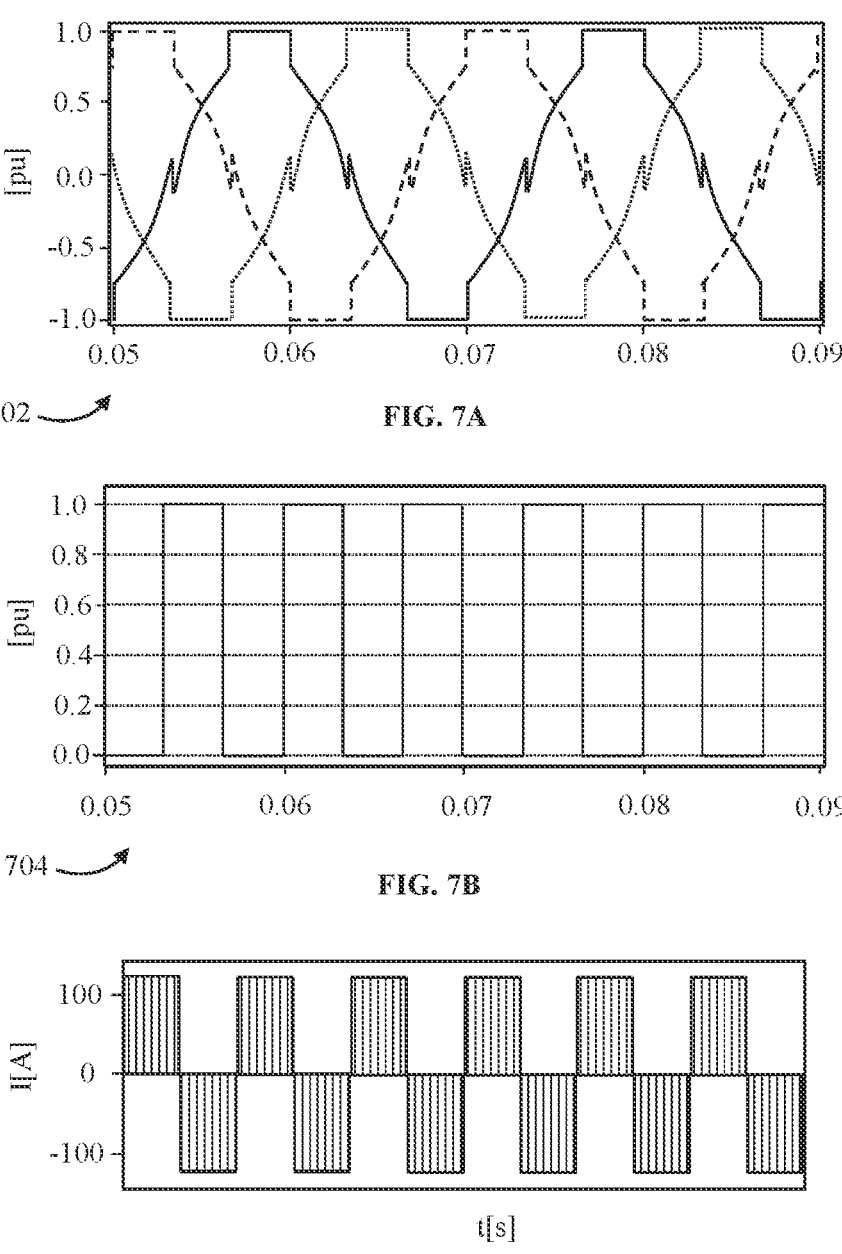
FIGS. 7A, 7B, and 7C are graphical representations of synchronization of an NPB circuit on discontinuous-pulse width modulator (DPWM) signals, a synchronizing signal and NPB converter current in accordance with an implementation of the disclosure.

FIGS. 7A-7C are graphical representations 702, 704, 706 of synchronization of an NPB circuit on DPWM signals, a synchronizing signal, and NPB converter current in accordance with an implementation of the disclosure. The NPB circuit synchronizes a power conversion direction to periods where voltage variation is maximum to transfer energy between partial DC-links. Optionally, the DPWM is used with the periods where the voltage is clamped either to volts (V) of direct current, VDC+ or VDC−. In FIG. 7A, the graphical representation 702 depicts the synchronization of the NPB circuit with the DPWM signal. In FIG. 7B, the graphical representation 704 depicts the synchronization of the NPB circuit with a signal with a positive clamping and a negative clamping of the DC-link. The graphical representation 702, 704 includes a voltage in pulse in an X-axis and time in seconds in a Y-axis. The graphical representation 706 depicts the synchronization of the NPB circuit with current on the NPB circuit. In FIG. 7C, the graphical representation 706 includes a current in ampere in an X-axis and time in seconds in a Y-axis.

Optionally, when the DPWM signal is used in an inverter, the partial DC-links charges and discharges with a frequency that triples an AC line fundamental frequency, e.g. 3×50 Hz. The NPB circuit may charges the DC-link that is being discharged by the inverter taking electrical charges from the DC-link that is being charged by the inverter, thereby compensating voltage fluctuations created by the inverter and reducing corresponding low frequency current circulation in the capacitors.

FIGS. 8A-8B are graphical representations 802, 804 of simulation results for DC-link capacitor currents in accordance with an implementation of the disclosure. In FIG. 8A, the graphical representation 802 depicts the simulation results for DC-link capacitor currents when an NPB circuit is not synchronized. The graphical representation 802 includes current in ampere in an X-axis and a time in seconds in a Y-axis. In FIG. 8B, the graphical representation 804 depicts the simulation results for DC-link capacitor currents when the NPB circuit is synchronized. The graphical representation 804 includes current in ampere in an X-axis and a time in seconds in a Y-axis.

Optionally, the graphical representations 802, 804 depict the DC-link capacitors in a split DC where reduction of high frequency current components and low frequency current components is possible. The high frequency current is referred to as I film cap and the low frequency current is referred to as I electrolytic cap.

FIG. 9 is a graphical representation of simulation results for a RMS value of current in DC-link capacitors in accordance with an implementation of the disclosure. The graphical representation provides observation on current reduction after an NPB circuit is synchronized. The observation shows the reduction of the high frequency components is small, and the synchronization increases the high frequency components with the NPB circuit. Optionally, the high frequency current component will increase due to the NPB operation when the NPB circuit is used without synchronization.

Although the disclosure and its advantages have been described in detail, it should be understood that various changes, substitutions, and alterations can be made herein without departing from the spirit and scope of the disclosure as defined by the appended claims.

We claim:

1. A power conversion system comprising:
   a first direct current (DC)-alternating current (AC) inverter;
   a second DC-AC inverter;
   an inverter controller coupled to the first DC-AC inverter and the second first DC-AC inverter and configured to provide a pulse-width modulation, (PWM) signal to the first DC-AC inverter and the second DC-AC inverter;
   a DC-link circuit coupling the first DC-AC inverter and the second DC-AC inverter in parallel, the DC link circuit and comprising:
      a positive voltage line;
      a negative voltage line;
      a neutral voltage line;
      a high-frequency positive-line capacitor;
      a low-frequency positive-line capacitor, wherein each of the high-frequency positive-line capacitor and the low-frequency positive-line capacitor couples the neutral voltage line with the positive voltage line;
      a high-frequency negative-line capacitor; and
      a low-frequency negative-line capacitor, wherein each high-frequency negative-line capacitor and the low-frequency positive-line capacitor couples the neutral voltage line with the negative voltage line;
   a neutral-point balancer (NPB) circuit coupled to the DC-link circuit and configured to reduce low-frequency current oscillations in the DC-link circuit by switching between a first state for transferring charge from the positive voltage line to the neutral voltage line, and a second state for transferring charge from the neutral voltage line to the negative voltage line; and an NPB controller coupled to the NPB circuit, synchronized with the PWM signal, and configured to control the switching of the NPB circuit.

2. The power conversion system of claim 1, wherein the NPB circuit is a bidirectional DC-DC converter.

3. The power conversion system of claim 2, wherein the NPB circuit comprises:

a first antiparallel diode;

a positive line switch coupling the neutral voltage line with the positive voltage line using the first antiparallel diode;

a second antiparallel diode;

a negative line switch coupling the neutral voltage line with the negative voltage line using the second antiparallel diode; and one or more inductors coupled to a coupling point between the first antiparallel diode and the second antiparallel diode, and to the neutral voltage line.

4. The power conversion system of claim 1, wherein each of the first DC-AC inverter and the second DC-AC inverter is a three-level inverter.

5. The power conversion system of claim 1, wherein the inverter controller is further configured to set an inverter switching frequency, and wherein the NPB controller is further configured to set an NPB circuit switching frequency of the NPB circuit to an integer multiple of the inverter switching frequency.

6. The power conversion system of claim 1, wherein the NPB controller is further configured to:

determine an optimal value for a phase angle between a carrier signal of the NPB circuit and the PWM signal at which high-frequency current oscillations in the DC-link circuit are below a threshold amplitude; and adjust a phase of the carrier signal to make the phase angle approach the optimal value.

7. The power conversion system of claim 6, wherein the NPB controller is further configured to determine the optimal value from a look-up table based on a ratio between a switching frequency of the NPB circuit and an inverter switching frequency of the inverter controller, and further based on a modulation used by the inverter controller.

8. The power conversion system of claim 6, wherein the NPB controller is further configured to determine the optimal value by monitoring a root mean square (RMS) value of a high-frequency current through the high-frequency positive-line capacitor and the high-frequency negative-line capacitor and adjusting the phase to set a value of the phase angle at which the RMS value is below the threshold amplitude.

9. The power conversion system of claim 1, wherein the inverter controller is further configured to set an inverter switching frequency, and wherein the high-frequency positive-line capacitor and the high-frequency negative-line capacitor are tuned to have a resonant frequency at a high-frequency that is a predefined frequency distance away from the inverter switching frequency.

10. The power conversion system of claim 1, wherein the high-frequency positive-line capacitor and the high-frequency negative-line capacitor are film type capacitors.

11. The power conversion system of claim 1, wherein the low-frequency positive-line capacitor and the low-frequency negative-line capacitor are configured to be tuned to make a branch coupling the low-frequency positive-line capacitor and the low-frequency negative-line capacitor have a resonant frequency in a frequency range between three times an output line frequency of the first DC-AC inverter and the second DC-AC inverter and a switching frequency of the first DC-AC inverter and the second DC-AC inverter.

12. The power conversion system of claim 11, wherein the resonant frequency is a predefined frequency distance away from boundaries of the frequency range.

13. The power conversion system of claim 1, wherein the low-frequency positive-line capacitor and the low-frequency negative-line capacitor are electrolytic type capacitors.

14. The power conversion system of claim 2, wherein each of the first DC-AC inverter and the second DC-AC inverter is a three-level inverter.

15. The power conversion system of claim 2, wherein the inverter controller is further configured to set an inverter switching frequency, and wherein the NPB controller is further configured to set a switching frequency of the NPB circuit to an integer multiple of the inverter switching frequency.

16. The power conversion system of claim 2, wherein the NPB controller is further configured to:

determine an optimal value for a phase angle between a carrier signal of the NPB circuit and the PWM signal at which high-frequency current oscillations in the DC-link circuit are below a threshold amplitude; and adjust a phase of the carrier signal to make the phase angle approach the optimal value.

17. The power conversion system of claim 2, wherein the inverter controller is further configured to set an inverter switching frequency, and wherein the high-frequency positive-line capacitor and the high-frequency negative-line capacitor are configured to have a resonant frequency that is a predefined frequency distance away from the inverter switching frequency.

18. The power conversion system of claim 2, wherein the high-frequency positive-line capacitor and the high-frequency negative-line capacitor are film type capacitors.

19. The power conversion system of claim 2, wherein the low-frequency positive-line capacitor and the low-frequency negative-line capacitor are configured to make a branch coupling the low-frequency positive-line capacitor and the low-frequency negative-line capacitor have a resonant frequency in a frequency range between three times an output line frequency of the first DC-AC inverter and the second DC-AC inverter and a switching frequency of the first DC-AC inverter and the second DC-AC inverter.

20. The power conversion system of claim 2, wherein the low-frequency positive-line capacitor and the low-frequency negative-line capacitor are electrolytic type capacitors.

* * * * *